INVENTOR.
ELVIN D. SIMSHAUSER
BY
Morris L. Rabkin
ATTORNEY

MATRIX PRINTER EMPLOYING PRINT BARS

Filed March 20, 1963 2 Sheets-Sheet 2

INVENTOR.
ELVIN D. SIMSHAUSER
BY Morris A. Rabkin
ATTORNEY

United States Patent Office 3,267,845
Patented August 23, 1966

3,267,845
MATRIX PRINTER EMPLOYING PRINT BARS
Elvin D. Simshauser, Camden, N.J., assignor to Radio Corporation of America, a corporation of Delaware
Filed Mar. 20, 1963, Ser. No. 266,548
8 Claims. (Cl. 101—93)

The present invention relates to information translating apparatus, and particularly to apparatus for printing on a document.

The invention is especially useful in a high speed printer which prints characters successively along a line on a document, the characters being formed from columns of dots. Such printers, called matrix printers, may be controlled by coded electrical signals which represent the characters to be printed. Such signals may, for example, be derived from electronic data processing equipment or from digital communications equipment.

A problem in high speed printers which are operated by electrical signals representing coded characters is translating the electrical signals into mechanical movements for operating printing elements at high speed. Electromagnetic transducers, such as solenoids, driven by current pulses in accordance with a code and which represent characters to be printed, are often used to drive linkages which provide the necessary movements of the printing elements. These linkages are usually complex if they are to provide fast forward and return travels and thereby attain high printing speeds. Moreover, the electromagnetic transducers themselves must be carefully designed to develop sufficient forces for actuating the printing elements to print sharp, clear characters. Because of the complexity of the linkages, the need for specially designed transducers, and for other reasons, high speed printers are usually complex and expensive.

It is an object of the present invention to provide an improved printer in which the foregoing difficulties and disadvantages are substantially eliminated.

It is a still further object of the present invention to provide an improved printer controllable by code signals representing characters to be printed and capable of printing characters at high speed, the printer being especially suitable for use in electronic data processing and digital communications.

It is a still further object of the present invention to provide an improved high speed printer which is lower in cost and less complex than known high speed printers.

It is a still further object of the present invention to provide an improved printer of the matrix type.

Briefly described, a printer embodying the invention may include a plurality of bars disposed adjacent to a document. Each of the bars may be actuated near one end thereof, as by being mechanically flexed, to propagate a mechanical pulse or undulation along the bar. This undulation results in a movement of the bar against the document for printing on the document.

The invention itself, both as to its organization and method of operation, as well as additional objects and advantages thereof, will become more readily apparent from the following description when read in connection with the accompanying drawings, in which:

FIG. 1 is a diagrammatic, perspective view of one form of printing apparatus embodying the invention;

FIG. 1*a* is a representation of a printed character;

Figures 1, 1A:
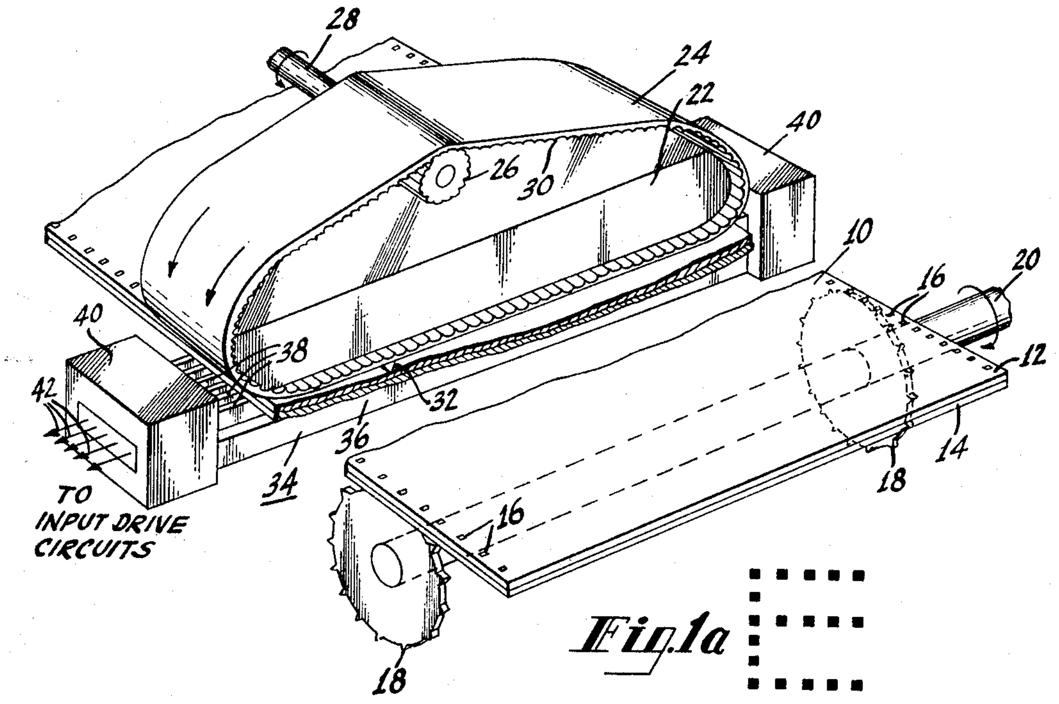

Referring more particularly to FIG. 1, a document 10 is shown. This document may be a sheet of blank paper 12 backed by a sheet of carbon paper 14. While one sheet of carbon paper backed blank paper is illustrated as constituting the document 10, a plurality of interleaved sheets of blank and carbon paper may be used when multiple copies are desired. The sheets, which may be unwound from a reel, have sprocket holes 16 along their edges. Sprocket wheels 18 engage these holes for transporting the documents through the apparatus. The sprocket wheels 18 may be interconnected by a shaft 20 which is coupled to a drive motor (not shown).

An arbor 22 is disposed widthwise across the document 10. The bottom surface of this arbor 22 parallels the document surface. An endless belt 24 is trained around the arbor and around a drive capstan 26. The capstan is attached to a shaft 28 which is driven by a motor (not shown). The same motor may drive the capstan shaft 28 and the sprocket wheel shaft 20 through a suitable gearing mechanism, when it is desired to synchronize document feed with the printing of lines on the document. The inner periphery 30 of the belt 24 and the periphery of the capstan may also be ribbed so that the belt 24 is positively driven.

A wedge-shaped anvil 32 is carried by the belt and attached to the outer periphery thereof. The apex 33 of this anvil 32 extends linearly across the belt 24 in the direction of movement of the document 10 and may be parallel to the edges of the document.

A print head 34 is disposed widthwise across the document 10 and is spaced from the lower reach of the belt, which passes around the bottom surface of the arbor 22, to define a passage for the document 10. This print head includes a plurality of slender print bars 36 of resilient material, such as a metal. Thin plates of nickel steel are suitable for the bars 36. Although six bars 36 are shown, more or less bars may be used. The bars 36 extend across the width of the document and may be perpendicular to the edges of the document. The distance in the direction of travel of the document which is occupied by the bars 36 is shorter than the length of the anvil 32. The apex of the anvil may be perpendicular to the longitudinal edges 38 of the bars 36. Supports 40 are provided at the opposite ends of the bars. Electromagnetic or mechanical actuator devices for actuating the bars may be located in or secured to one of these supports 40. Leads 42 for delivering energy for operating these actuators are connected to the actuators in the one of these supports 40, shown at the left in FIG. 1.

Figure 2:
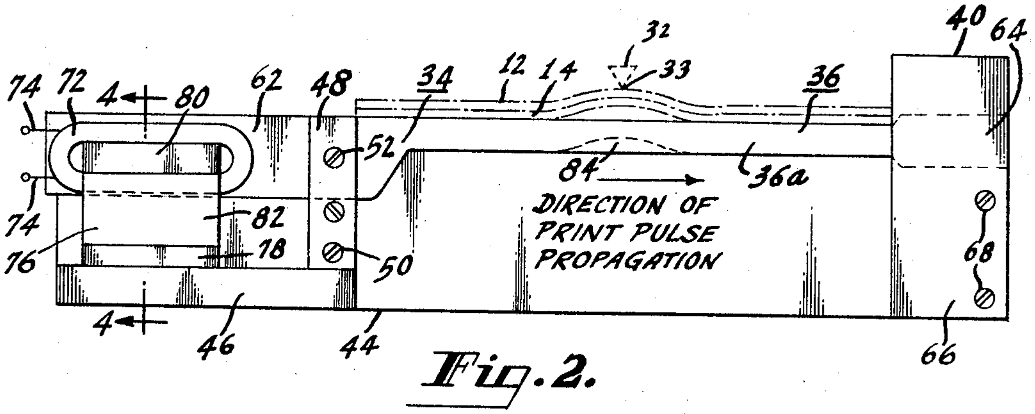
FIG. 2 is an elevational view showing, in greater detail, the print head used in the apparatus illustrated in FIG. 1.
Figure 3:
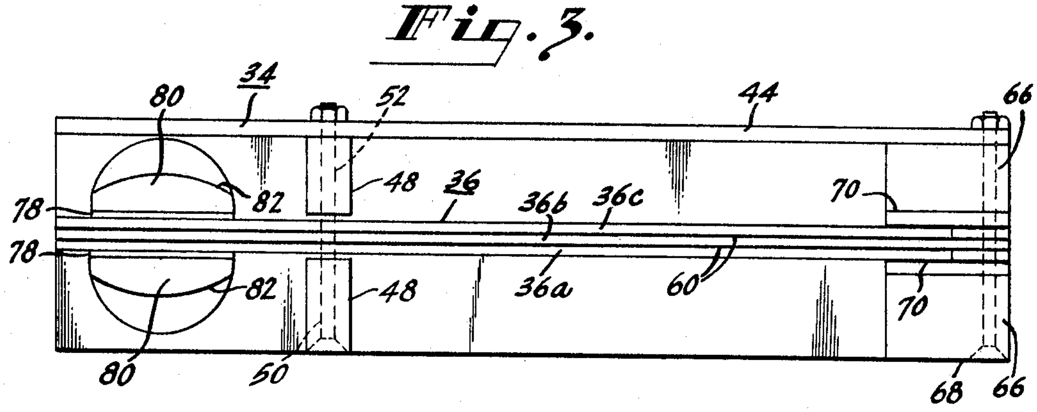
FIG. 3 is a plan view of the print head shown in FIG. 2.
Figure 4:
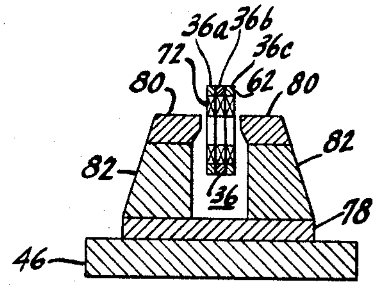
FIG. 4 is a fragmentary, sectional view taken along the line 4—4 in FIG. 2, and viewed in the direction of the appended arrows.

The print head 34 is shown in greater detail in FIGS. 2 to 4. A back plate 44 is provided to which a base plate 46 is attached. A yoke-like bracket member 48 is secured, as by screws 50, to the back plate 44. A pin 52 extends through the bracket member 48 and through a series of aligned holes in each of the plurality of print bars 36. Only three print bars, **36*a*, 36*b* and 36*c*, are shown to simplify the illustration. These print bars are arranged in side-by-side relationship separated by spacers 60. Non-adhering sheets, as of a plastic, such as "Teflon," may be used as the spacers 60. These print bars 36*a*, *b* and *c* each have an enlarged forward end 62 and an enlarged rear end 64. The pin 52 supports the forward end 62 of each bar at a point spaced toward the rear end 64 so that a portion of the forward end of the bar is free and defines a cantilever. The rear ends 64 are secured between clamping members 66 which are, in turn, secured to the back plate 44 by nuts and bolts 68 extending therethrough. Pads 70 of damping material are disposed in opposed relation against the outer surfaces of the outermost print bars 36***a* and 36*c* near the rear ends of the bars. These pads 70 may be step-shaped members of lead-loaded synthetic rubber or the like. The center one of the bars, 36*b*, may be longer than the other bars 36*a* and 36*c* and the damping material pads 70 may be disposed also against the sides of the center bar at the extended end portion thereof, as well as against the sides of the other bars 36*a* and 36*c*. The pads 70 are therefore interposed between the clamping members 66 and the bars 36. The bars 36 are supported at their forward ends 62 by the pin 52 and at their rear ends 64 by the pads 70.

Multi-turn, pancake-shaped coils 72 are secured in the forward ends 62 of the bars, as by embedding them in openings in the forward ends 62. An epoxy resin may be used to encapsulate and firmly secure the pancake coils in the bars. Leads 74 for applying currents to the coils may be connected thereto.

A magnetic field structure 76 is supported on the base plate 46. This field structure (see FIG. 4) includes a bottom plate 78 of magnetic material, such as soft iron, and a pair of pole plates 80, also of soft iron, separated by trapezoidal, permanent magnets 82 of suitable permanent magnet material, such as an iron-nickel-cobalt alloy known as "Alnico V," for example. The pole plates 80 are spaced from each other to define an air gap in which a magnetic field is established. The coils 72 of each of the bars 36*a*, 36*b* and 36*c* are immersed in this field.

In operation, current pulses (for example, in accordance with a code representing a character to be printed) are applied to the coils 72 to actuate one or more of the bars 36. The magnetic field around the respective coils 72 resulting from current passing through the coils interacts with the magnetic field in the air gap between the pole plates 80, and a force in a direction perpendicular to the lonigtudinal edges 38 of the respective print bars 36 is produced. This force tends to flex the bars 36 in an upward direction, as viewed in FIG. 2, and tends to pivot the forward ends 62 of the bars about the rod 52 which fixedly holds the bars. A mechanical pulse, wave or undulation is thereby propagated longitudinally along the particular bar or bars which may have been actuated. This pulse appears as an edge-wise deflection shown by the rather exaggerated (for the sake of clearness) dash lines 84 which travels from the forward end 62 to the rear end 64 of the actuated bar. Where this undulation crosses the wedge-shaped anvil 32, the longitudinally edge of the actuated bar is incrementally displaced toward the document and presses the sheets 12 and 14 of the document against the anvil and causes the printing of a dot on the blank paper sheet 12 by transferring carbon from the carbon paper 14 to the document sheet. Since the anvil 32 extends linearly across the print bars, a column of dots may be formed by simultaneously pulsing each of the coils 72 on the respective bars 36. The undulations are absorbed by the pads 70 of damping material surrounding the rear ends 64 of the bars 36, and thus reflection of the undulation back along the bars is prevented. By successively pulsing the coils and propagating successive pulses longitudinally along the bars as the anvil 32 also moves longitudinally along the bars, successive columns of dots may be printed on the document 10. A number (say, five) of columns of dots form the character represented by the coded signal currents passed through the coils 72. Thus, successive characters may be printed along a line on the document. As the anvil 32 traverses a line, the paper advances and presents the next line to the print head.

A plurality of anvils 32 may be carried on the belt 24. These may be spaced from each other so that the second succeeding anvil moves into printing position, for example, at the left edge of the documents just after the first moves out of a printing position, for example, at the right edge of the documents. It may be desirable to provide a switch actuated by a protrusion on the belt adjacent each anvil which controls the drive circuits to the actuators so that the printing of a line starts when an anvil reaches a position near the left-hand edge of the documents 10. Other techniques known in the computer art may be used to synchronize the movement of the anvil with the incoming data, for example, synchronizing the speed of rotation of the motor which drives the belt drive capstan 28 with the data or with clock pulses which accompany the data. Accordingly, successive lines may be printed on the document to form a message of page length, if desired.

Assume, by way of example, that six bars 36 are included in the print head 34, as shown in FIG. 1, and that the actuators which propagate mechanical pulses along one or more of the bars are included in the one of the supports 40 shown to the left in FIG. 1. The anvil 32 moves continuously at constant speed across a line on the documents 10 along the longitudinal edges 38 of the bars 36. A character, say, the letter "E," is printed as the anvil moves one character space. At each of a plurality, say, five, successive equally spaced instants of time, while the anvil is moving through the character space, the actuators are energized to actuate selected combinations of bars in accordance with the code for the letter "E." Since the anvil moves at constant speed, it is at five positions equally spaced from each other respectively at each of the five instants of time.

All six bars are actuated at the first instant of time, thereby propagating six pulses along parallel paths on respective ones of the bars. These pulses simultaneously cross the anvil in its first position, and press the documents against the anvil to print a first column of six dots which forms the vertical leg of the "E." The top, bottom and a middle one of the bars are actuated at the second instant, three pulses are propagated which cross the anvil in its second position to print a vertical column of three dots. The same three bars may be actuated at each of the third, fourth, and fifth instants so that three successive columns of three dots similar to the second column of dots are printed thereby forming the horizontal legs of the "E." Other characters are printed in successive character spaces along the line until the line is completed.

An incremental feed mechanism for presenting a line at a time to the print head may be used to drive the sprockets 18. This feed mechanism may be synchronized with the movement of the anvil 32 by utilizing suitable gearing and a common drive motor for the sprocket drive shaft 20 and for the capstan drive shaft 28.

Figure 6:
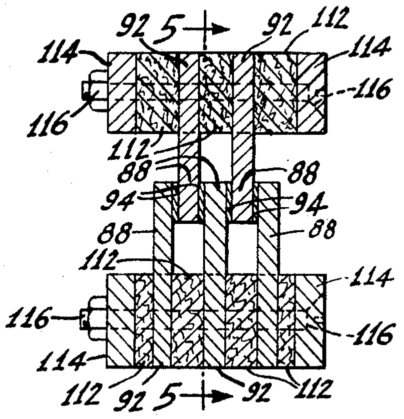
FIG. 6 is a sectional view taken along the line 6—6 in FIG. 5, and viewed in the direction of the appended arrows.
Figure 5:
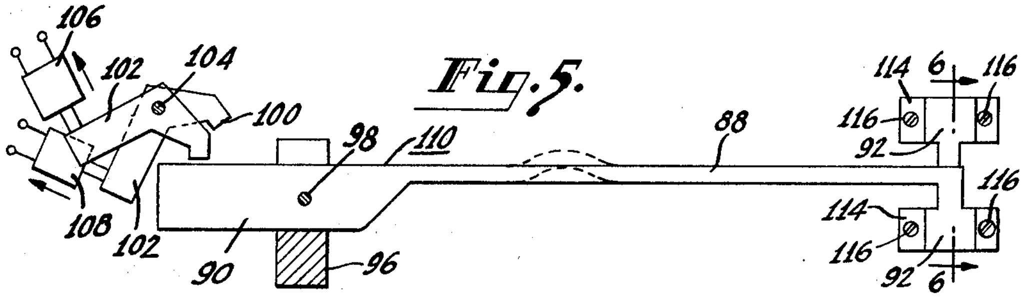
FIG. 5 is a fragmentary, side elevational view of another embodiment of a print head in accordance with the invention, the view being taken along the line 5—5 in FIG. 6 and viewed in the direction of the appended arrows.

Referring to FIGS. 5 and 6, another embodiment of a print head is illustrated. This head includes print bars 88 having forward ends 90 and rear ends 92. The print bars 88 may be disposed in side-by-side relationship separated by spacers 94 of non-adhering material, such as "Teflon." Five bars 88 are illustrated (see FIG. 6). The forward ends of the bars are secured by brackets 96 similar to the brackets 48 (FIG. 2) and by a pin 98 similar to the pin 52. Striker arms, two of which, 100 and 102, are shown, are disposed adjacent the forward ends 90 of the bars 88. The striker arms are in the form of bell cranks which are mounted for rotation on a pivot 104. Solenoids 106 and 108 are armature-connected to the striker arms 100 and 102, respectively. These solenoids are spring-biased to rotate the striker arms in a counterclockwise direction away from the rear ends 90 of their associated bars 88.

When the solenoids are actuated, they pivot the striker arms in a clockwise direction, causing them to impact the longitudinal edge 110 of their respectively associated arms 88, thereby causing those arms to flex or pivot about the pin 98. Mechanical pulses or undulations are then excited in the bars 88. These undulations travel longitudinally of the bars and deflect the various bars edgewise against an anvil (such as the anvil 32 (FIG. 1)) for printing successive columns of dots on documents, as was explained in connection with FIGS. 2 to 4.

Pads 112 of damping material are interleaved between the rear ends 92 of the bars for absorbing the propagated pulses and preventing reflection thereof back towards the forward ends 90 of the bars 88. The ends 92 of alternate ones of the bars 88 are respectively offset upwardly and downwardly to provide room for the pads 112 of damping material. The rear ends 92 and the pads may be clamped together in side-by-side relationship by means of clamping plates 114 held together by nuts and bolts 116. The bars 88 have large clearance holes where the bolts 116 pass through, so that there is no metal-to-metal connection between the bolts 116 and the bars 88.

From the foregoing description, it will be apparent that there has been provided improved printing apparatus less complicated and lower in cost than known high speed printing apparatus. Since mechanical pulses may be propagated along printing bars embodying the present invention at high speed, the characters may be printed on the document very rapidly. Variations and modifications in the herein described embodiments of the invention will undoubtedly suggest themselves to those skilled in the art. Accordingly, the foregoing description should be taken merely as illustrative and not in any limiting sense.

What is claimed is:

1. In an apparatus for printing on a document, the combination comprising (a) a plurality of bars of resilient material, (b) a backing element movable longitudinally along said bars and spaced therefrom to provide a passage for said document therebetween, a lineal surface of said backing element being disposed laterally across said bars, (c) a magnetic field structure having an air gap across which a constant magnetic field is established, (d) a plurality of coils each secured to end portions of a different one of said bars and immersed in said magnetic field, and (e) means for applying electrical pulses selectively to said coils to establish magnetic fields therearound which react with said constant magnetic field for generating mechanical pulses which propagate longitudinally along said bars to displace said selected bars incrementally toward said document and print a column of marks on said document when said incremental bar displacements press said document against said surface of said element.

2. Apparatus for printing on a document sheet which is backed by a carbon paper sheet, said sheets being movable along a prescribed path, said apparatus comprising (a) a plurality of elongated bars of resilient material each having a longitudinal edge disposable adjacent to said sheets at said path, said bars being disposed in side-by-side relationship, (b) an anvil member presenting a lineal surface disposed across said longitudinal edges, said member and said bars being on opposite sides of said path, (c) an endless belt movable along a second path paralleling said longitudinal edges, said anvil member being mounted on said belt, and (d) a plurality of striker arms each corresponding to a different one of said bars, all of said arms being mounted adjacent to ends of their corresponding bars for movement in a direction perpendicular to said longitudinal edges into striking engagement with said bars for generating at each said bar a mechanical pulse propagateable therealong and which will incrementally displace said longitudinal edges against said sheets for printing successive columns of dots along a line on said document sheet, said columns forming legible characters.

3. In apparatus for printing by impression on a document, the combination comprising:

(a) a slender print bar, (b) a backing element disposed opposite said print bar and spaced therefrom to define a receiving area for a document to be printed, (c) means moving said backing element parallel to said bar in a direction from one end thereof to the other, and (d) means for propagating a mechanical undulation longitudinally along said bar at a selected time for progressively displacing successive incremental portions of said bar toward said document and printing by impression at the location where said undulation presses the document against said backing element.

4. In apparatus for printing by impression on a document, the combination comprising:

(a) a plurality of print bars disposed side-by-side and each having a longitudinal printing edge, (b) a backing element disposed across the printing edges of said bars and being spaced therefrom to define a receiving area for a document to be printed, (c) means moving said backing element parallel to said printing edges in a direction from one end of the bars to the other end, and (d) means for propagating a mechanical undulation longitudinally along selected ones of said bars, when said backing element is at a selected position along its path of travel, for progressively displacing successive incremental portions of the selected bars toward said document and impressing said document against said backing element when the displaced bar portion is opposite said backing element.

5. The combination claimed in claim 4, wherein said propagating means comprises means for flexing each bar selectively and individually near one end thereof, and wherein said combination further includes damping means located at the other ends of the bars for preventing reflections of the undulations.

6. The combination claimed in claim 4, wherein said propagating means comprises means for impacting each bar selectively and individually, near one end thereof, in a direction perpendicular to its printing edge, and wherein said combination further includes damping means at the other ends of said bars for preventing reflections of the undulations.

7. In a machine for printing on a document, the combination comprising:

(a) a print bar having a longitudinal printing edge, (b) first and second support means supporting said bar with the printing portions of the longitudinal edge thereof substantially equidistant from a document to be printed, (c) said first support means supporting said bar relatively fixedly at a first location spaced from a first end of the bar, (d) said second support means supporting said bar relatively loosely at a location near the second end of the bar, and (e) means for applying a force to a portion of the bar between said first end and said first support means for propagating a mechanical undulation longitudinally along said bar which progressively displaces successive incremental portions of the printing edge toward said document.

8. The combination as claimed in claim 7, including (a) other, similar print bars supported by said first and second support means in side-by-side relationship with the first-mentioned print bar, (b) separate force applying means individual to the several print bars, (c) wherein said first support means comprises a rod projecting through a series of aligned holes in the several print bars, and (d) wherein said second support means includes means for damping undulations when they reach the second support means.

References Cited by the Examiner

UNITED STATES PATENTS

| | | | |
|---|---|---|---|
| 1,489,500 | 4/1924 | Lord | 101—109 X |
| 1,716,699 | 6/1929 | Kirkegaard | 101—32 |
| 2,102,771 | 12/1937 | Watkins | 101—287 X |
| 2,659,652 | 11/1953 | Thompson | 101—93 X |
| 2,687,088 | 8/1954 | Hennessy et al. | 101—297 X |
| 2,874,634 | 2/1959 | Hense | 101—93 X |
| 2,928,896 | 3/1960 | Dirks | 101—93 X |
| 2,976,801 | 3/1961 | Dirks | 101—93 |
| 3,038,158 | 6/1962 | Allen et al. | 101—93 X |
| 3,072,045 | 1/1963 | Goin | 101—93 |
| 3,133,497 | 5/1964 | Martin | 101—111 X |
| 3,164,084 | 1/1965 | Paige | 101—11 X |

WILLIAM B. PENN, *Primary Examiner.*